April 1, 1958 — C. G. MIKKELSEN — 2,828,717
POULTRY WATERING TROUGH
Filed Nov. 16, 1955
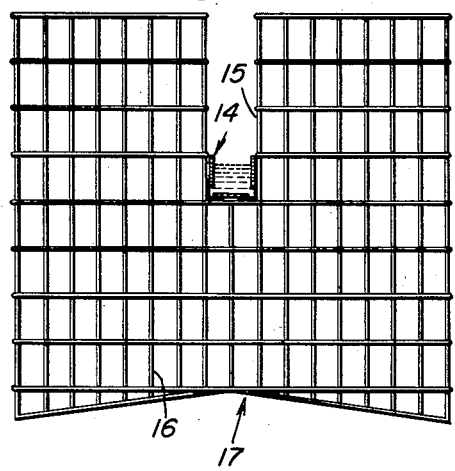
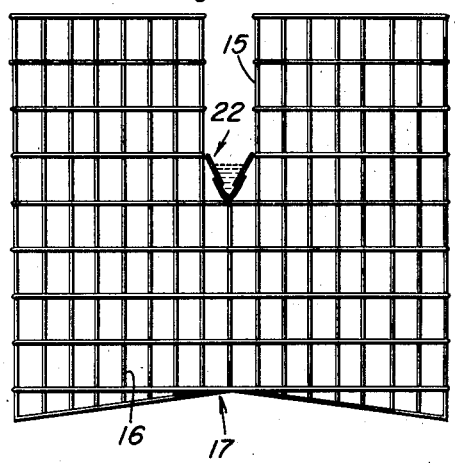
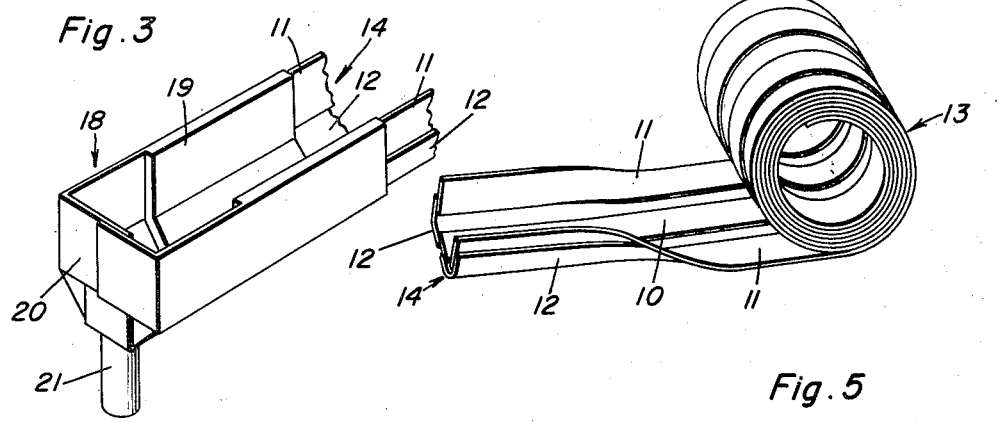
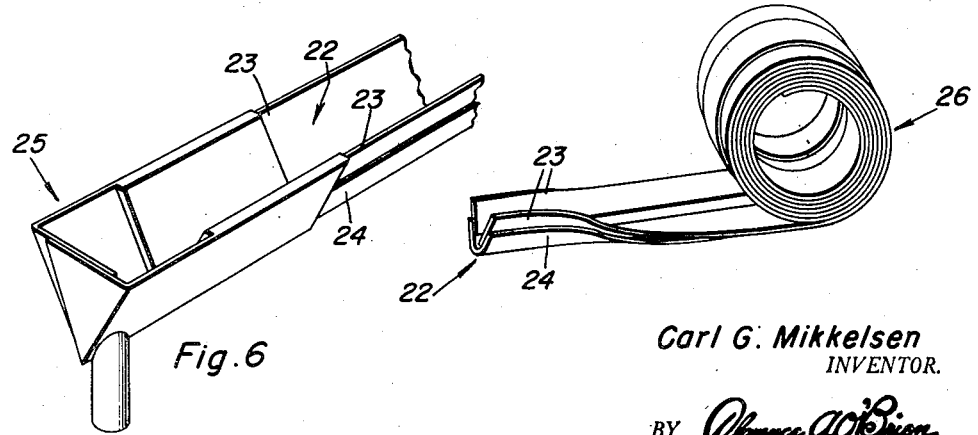
Carl G. Mikkelsen
INVENTOR.

United States Patent Office 2,828,717
Patented Apr. 1, 1958

2,828,717
POULTRY WATERING TROUGH
Carl G. Mikkelsen, Hilliard, Fla.
Application November 16, 1955, Serial No. 547,083
5 Claims. (Cl. 119—61)

The present invention relates to new and useful improvements in poultry watering troughs particularly for laying cages and has for its primary object to provide, in a manner as hereinafter set forth, a continuous, flexible, jointless trough of this character which may be taken in any desired length from a roll and expeditiously installed or removed without unduly disturbing the birds and with a minimum of labor.

Another very important object of the invention is to provide a flexible, rollable watering trough of the aforementioned character which, when unrolled, installed and with water therein, will be sufficiently rigid to be self-sustaining.

Other objects of the invention are to provide a poultry watering trough of the character described which will be comparatively simple in construction, strong, durable, compact, sanitary and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a view in end elevation of a laying cage showing, in cross section, a watering trough constructed in accordance with the present invention;

Figure 2 is a perspective view, showing the trough being drawn from a roll;

Figure 3 is an enlarged perspective view, showing the end fitting;

Figure 4 is an elevational view substantially similar to Figure 1 but showing, in cross section, another form of the trough;

Figure 5 is a perspective view of the modification, showing the trough being drawn from a roll; and Figure 6 is an enlarged perspective view of the end fitting of the modification.

Referring now to the drawing in detail, it will be seen that the embodiment of the invention which has been illustrated in Figures 1, 2 and 3 of said drawing comprises spaced, parallel intermediate and outer or side strips 10 and 11, respectively, of metal, plastic or other suitable semi-flexible material, which strips may be of any desired dimensions. The strips 10 and 11 are bonded to the longitudinal marginal portions of a pair of spaced, parallel flexible strips 12 of neoprene, plastic or other suitable waterproof material. The elements 10, 11 and 12 may be joined in any suitable manner.

There is thus provided a flexible, resilient unit which may be readily coiled into a roll, as indicated at 13 in Figure 2 of the drawing. When the device is uncoiled from the roll 13 the side strips 11 may be readily turned upwardly to provide a substantially U-shaped trough 14. The trough 14 is adapted to be readily mounted in openings 15 in the usual welded wire fabric end walls 16 of a laying cage 17. Any desired length of the trough 14 may be drawn from the roll 13 and cut off as may be required for the number of laying cages in the row. The strips 10 and 11 resist edgewise bending. Thus, when the substantially U-shaped trough is installed it is supported vertically by the side strips 11. Then, the horizontal middle or intermediate strip 10 resists lateral or horizontal distortion of the trough.

In Figure 3 of the drawing, reference character 18 designates generally an end fitting or closure of suitable metal for the trough 14. The fitting 18 is susbtantially U-shaped in cross section and comprises on one end, which is open for communication with the trough 14, a socket 19 for the reception of the end portion of said trough. The trough 14 is adhesively or otherwise suitably secured in the socket 19. The other end of the fitting 18 is closed, as indicated at 20. Depending from the closed end portion of the fitting 18 is a drain tube 21.

In the embodiment of Figures 4, 5 and 6 of the drawing, reference character 22 designates a continuous, flexible trough of substantially V-shaped cross section. The trough 22 comprises a pair of substantially semi-flexible side strips 23 of metal, plastic or other suitable material. The strips 23 are bonded to the longitudinal marginal portions of a flexible intermediate strip 24 of neoprene, plastic or other suitable material. In other respects the trough 22 is substantially similar to the trough 14.

In Figure 6 of the drawing, reference character 25 designates an end fitting or closure for the trough 22. Toward this end, the fitting 25 is substantially V-shaped in cross section. In other respects, the fitting 25 is substantially similar to the fitting 18. The trough 22 is adapted to be coiled into a roll, as indicated at 26.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A watering trough for poultry and the like, said watering trough comprising a pair of stiff side walls and a bottom wall forming member interconnecting said side walls, said bottom wall forming member being longitudinally elongated and extending longitudinally of the watering trough, said bottom wall forming member including at least one elongated longitudinally extending flexible element in abutting relationship with said side walls whereby said side walls and said bottom forming member may be disposed generally coplanar and rolled into a roll for storage.

2. A watering trough for poultry and the like, said watering trough comprising a pair of stiff side walls and a bottom wall forming member interconnecting said side walls, said bottom wall forming member being longitudinally elongated and extending longitudinally of the watering trough, said bottom wall forming member including a central stiff longitudinally extending bottom element and a pair of elongated longitudinally extending flexible elements, said flexible element being disposed intermediate said bottom element and said side walls and being connected thereto whereby said side walls and said bottom wall forming member may be disposed generally coplanar and rolled into a roll for storage.

3. A watering trough for poultry and the like, said watering trough comprising a pair of stiff side walls and a bottom wall forming member interconnecting said side walls, said bottom wall forming member being longitudinally elongated and extending longitudinally of the watering trough, said bottom wall forming member including a central stiff longitudinally extending bottom element and a pair of elongated longitudinally extending flexible elements, said flexible element being disposed intermediate said bottom element and said side walls and being connected thereto, said flexible elements being angular in cross-section, whereby said side walls and said bottom wall forming member may be disposed generally coplanar and rolled into a roll for storage.

4. A watering trough for poultry and the like, said watering trough comprising a pair of stiff side walls, said side walls being disposed in downwardly converging relation and being connected together by a bottom wall forming member, said bottom wall forming member being longitudinally elongated and extending longitudinally of the watering trough, said bottom wall forming member being in the form of an elongated flexible element which has the opposite edges thereof secured to said side walls whereby said side walls and said bottom forming member may be disposed generally coplanar and rolled into a roll for storage.

5. A watering trough for poultry and the like, said watering trough being generally U-shaped in outline and comprising a pair of stiff side walls disposed in generally parallel relation and a bottom wall forming member extending between and connecting together said side walls, said bottom wall forming member including a centrally located longitudinally extending relatively stiff bottom element and a pair of outer longitudinally extending flexible elements, said flexible elements being angular in cross-section and forming corners of the watering trough, said flexible elements being secured to respective ones of said side walls and to said bottom wall element.

References Cited in the file of this patent

UNITED STATES PATENTS

| | | |
|---|---|---|
| 1,375,283 | Dunbar | Apr. 19, 1921 |
| 1,877,799 | Brigham | Sept. 20, 1932 |
| 2,384,900 | Duncan | Sept. 18, 1945 |
| 2,466,911 | Raymond | Apr. 12, 1949 |
| 2,491,396 | Seckel | Dec. 13, 1949 |
| 2,626,724 | Smallegan | Jan. 27, 1953 |
| 2,711,240 | Smallegan | June 21, 1955 |